(12) United States Patent
Nomura

(10) Patent No.: US 8,289,626 B2
(45) Date of Patent: Oct. 16, 2012

(54) ROTATIONALLY EXTENDABLE STRUCTURE OF LENS BARREL

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 154 days.

(21) Appl. No.: 12/826,094

(22) Filed: Jun. 29, 2010

(65) Prior Publication Data

US 2011/0002050 A1    Jan. 6, 2011

(30) Foreign Application Priority Data

Jul. 3, 2009    (JP) ................. 2009-159325

(51) Int. Cl.
*G02B 15/14* (2006.01)
(52) U.S. Cl. ........................ 359/696; 359/699
(58) Field of Classification Search ........... 359/696
See application file for complete search history.

(56) References Cited

U.S. PATENT DOCUMENTS

| | | | |
|---|---|---|---|
| 6,798,582 B2 | 9/2004 | Nomura et al. | |
| 7,321,471 B2 | 1/2008 | Kuroki | |
| 7,672,579 B2 | 3/2010 | Nomura | |
| 7,742,237 B2 | 6/2010 | Nomura et al. | |
| 7,780,362 B2 | 8/2010 | Nomura et al. | |
| 2005/0169621 A1* | 8/2005 | Nomura | 396/72 |
| 2007/0064319 A1 | 3/2007 | Kuroki | |
| 2007/0092238 A1* | 4/2007 | Shirakata | 396/72 |
| 2010/0232036 A1 | 9/2010 | Ishizuka | |

FOREIGN PATENT DOCUMENTS

| | | |
|---|---|---|
| JP | 06-088932 | 3/1994 |
| JP | 07-191250 | 7/1995 |
| JP | 11-52211 | 2/1999 |
| JP | 2000-75194 | 3/2000 |
| JP | 2002-168308 | 6/2002 |
| JP | 2003-227989 | 8/2003 |
| JP | 2004-151710 | 5/2004 |
| JP | 2006-301058 | 11/2006 |
| JP | 2007-079447 | 3/2007 |
| JP | 2007-114530 | 5/2007 |

OTHER PUBLICATIONS

Japan Office action, dated Sep. 27, 2011 along with an english translation thereof.
Japanese Office Action, dated May 29, 2012, along with an English translation thereof.

* cited by examiner

*Primary Examiner* — Ricky Mack
*Assistant Examiner* — Zachary Wilkes
(74) *Attorney, Agent, or Firm* — Greenblum & Bernstein, P.L.C.

(57) ABSTRACT

A rotationally extendable structure of a lens barrel includes a stationary ring; a rotational ring, supported by the stationary ring to move in an optical axis direction while rotating and includes a peripheral gear at the rear end thereof; and a rotational-ring drive gear. The rotational-ring drive gear includes a long gear portion, formed long enough to mesh with the peripheral gear over an entire moving range of the rotational ring, and a large-diameter gear portion at the rear end of the long gear portion. The rotational ring is provided in a rear end thereof with a large-diameter-gear accommodating recess. When the rotational ring is moved to a rearward movement extremity in the optical axis direction, the large-diameter gear portion enters into the large-diameter-gear accommodating recess so that the large-diameter gear portion coincides with the peripheral gear with respect to the optical axis direction.

5 Claims, 17 Drawing Sheets

N1: Barrel-advancing rotational direction (of cam ring)

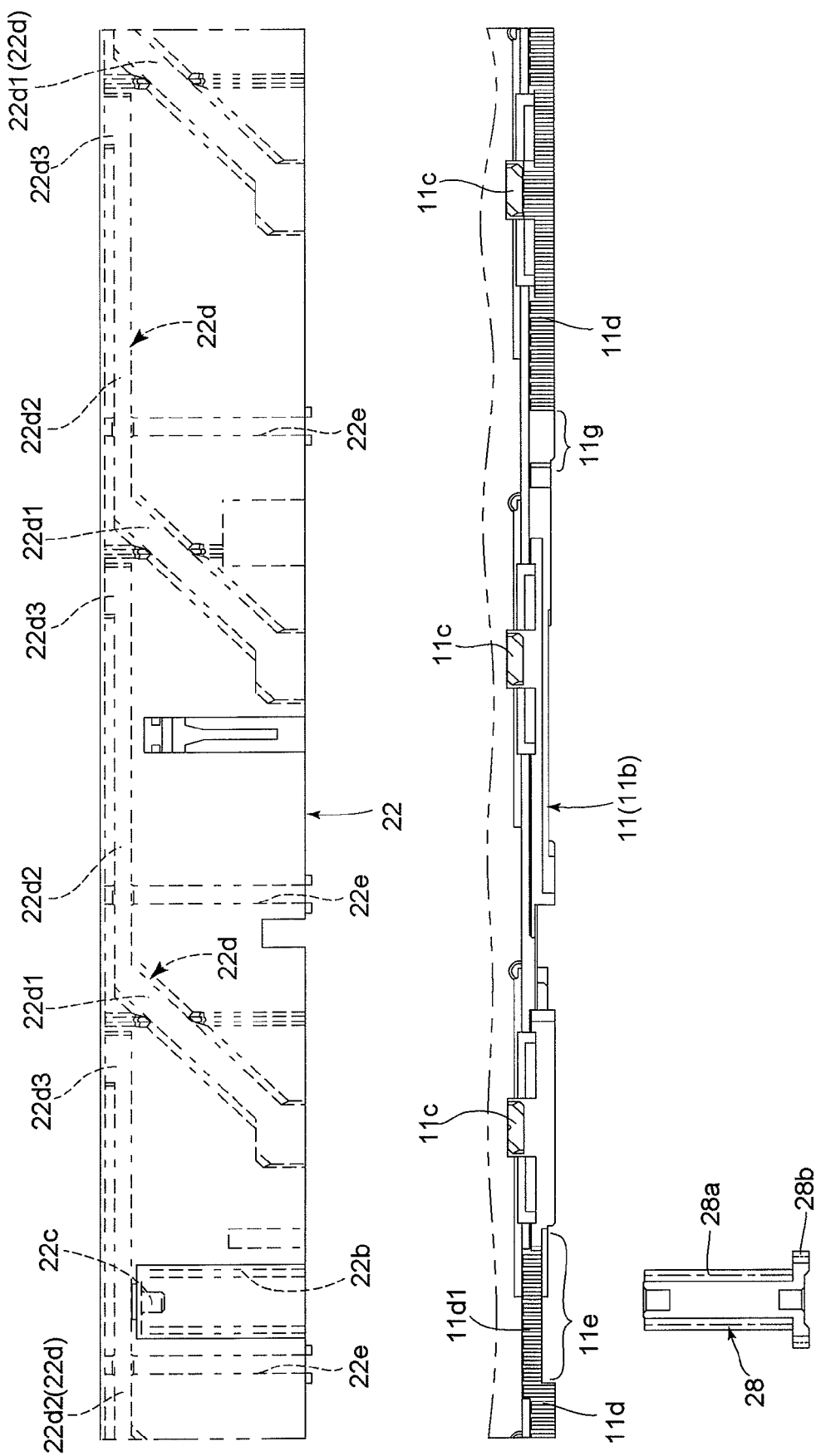

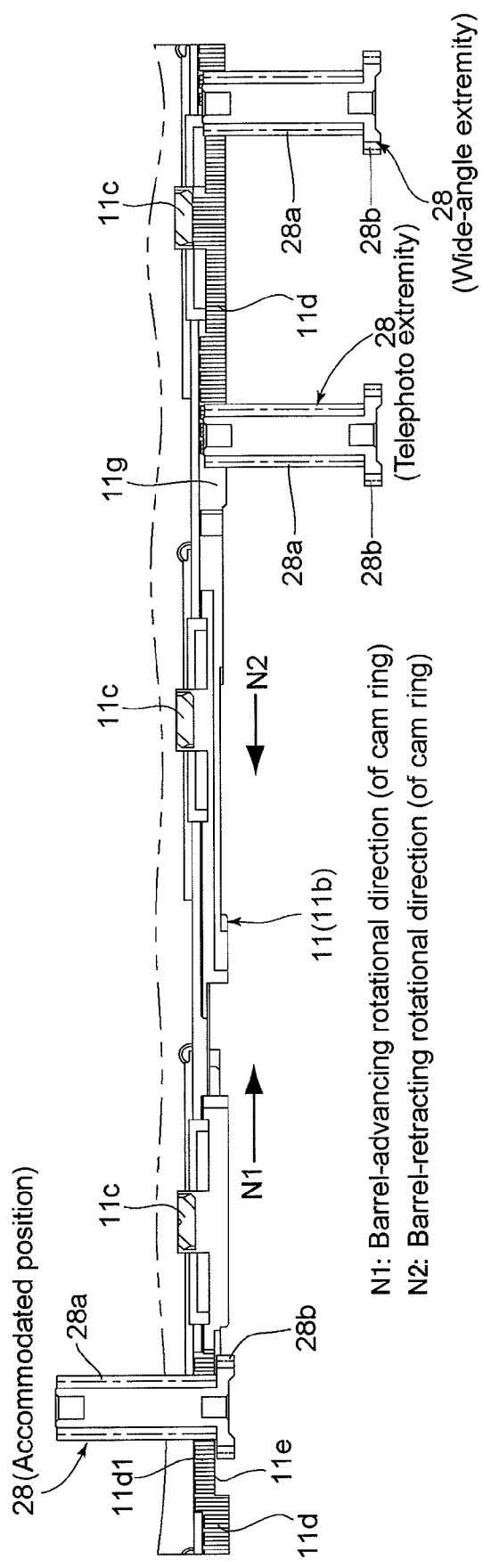

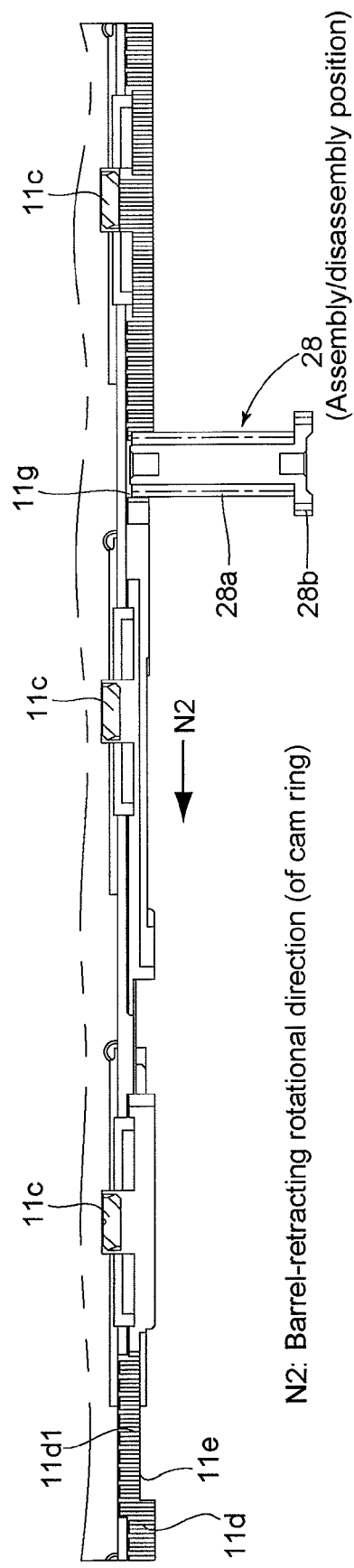

N1: Barrel-advancing rotational direction (of cam ring)

N1: Barrel-advancing rotational direction (of cam ring)
N2: Barrel-retracting rotational direction (of cam ring)

N2: Barrel-retracting rotational direction (of cam ring)

N1: Barrel-advancing rotational direction (of cam ring)

N1: Barrel-advancing rotational direction (of cam ring)
N2: Barrel-retracting rotational direction (of cam ring)

N1: Barrel-advancing rotational direction (of cam ring)
N2: Barrel-retracting rotational direction (of cam ring)

N1: Barrel-advancing rotational direction (of cam ring)
N2: Barrel-retracting rotational direction (of cam ring)

ROTATIONALLY EXTENDABLE STRUCTURE OF LENS BARREL

BACKGROUND OF THE INVENTION

1. Field of the Invention

The present invention relates to a rotationally extendable structure (rotational telescoping structure/rotationally retractable structure) of a rotational ring that is a constituent member of a lens barrel.

2. Description of Related Art

In regard to a rotational ring which is provided in a lens barrel and moves in an optical axis direction while rotating about the optical axis, a structure is employed in which a rotational driving force of a motor is transferred to the rotational ring via a peripheral gear, provided on the outer periphery of the rotational ring, and a gear (rotational-ring drive gear) that is in mesh therewith. Such a structure is disclosed in, for example, Japanese Unexamined Patent Publication Nos. H11-52211 and 2002-168308.

Generally, the above-described rotational-ring drive gear is supported by a stationary member, and the length of the rotational-ring drive gear needs to be long enough in order to maintain engagement with the peripheral gear of the rotational ring throughout the entire movement range of the rotational ring in the optical axis direction. On the other hand, it is necessary to provide a reduction gear train (gear reduction mechanism) between the motor and the rotational ring; however, due to the rotational-ring drive gear being configured as a long gear that can mesh with the peripheral gear of the rotational ring throughout the entire axial length of the rotational-ring drive gear, the gear (of the reduction gear train) that is directly in mesh with the rotational-ring drive gear must be configured as an idle gear, having no gear-reduction capability, in order to avoid interference with the rotational-ring drive gear (long gear); hence, a large number of gears are required for the reduction gear train, which becomes a cause of restricting the downsizing (miniaturization) of the lens barrel. Whereas, if the rotational-ring drive gear itself is configured as a double gear having a gear-reduction capability in order to increase the reduction gear ratio, a large-diameter reduction gear, which is coaxial with the long gear, needs to be added to (formed on) the long gear that is in mesh with the peripheral gear of the rotational ring. Hence, restrictions are brought on the movement of the rotational ring due to the presence of this large-diameter reduction gear, which is also a cause of restricting the downsizing (miniaturization) of the lens barrel.

SUMMARY OF THE INVENTION

In view of the above-described problems, the present invention achieves a rotationally extendable structure of a lens barrel which can provide a compact (small) gear reduction mechanism that does not restrict the amount of movement of a rotational ring in the direction of the rotational axis thereof (optical axis of the lens barrel).

According to an aspect of the present invention, a rotationally extendable structure of a lens barrel is provided, including a stationary ring; a rotational ring, which is supported by the stationary ring to move in an optical axis direction while rotating, the rotational ring including a peripheral gear at the rear end thereof with respect to the optical axis direction; and a rotational-ring drive gear, which is rotatably driven by a motor that is supported by the stationary ring. The rotational-ring drive gear includes a long gear portion, which is formed long enough in the optical axis direction to mesh with the peripheral gear over an entire moving range in the optical axis direction of the rotational ring, and a large-diameter gear portion provided at the rear end of the long gear portion, wherein a rotational driving force of the motor is transmitted to the large-diameter gear portion. The rotational ring is provided in a rear end thereof with a large-diameter-gear accommodating recess, into which the large-diameter gear portion can enter. When the rotational ring is moved to a rearward movement extremity in the optical axis direction, the large-diameter gear portion of the rotational-ring drive gear enters into the large-diameter-gear accommodating recess so that the large-diameter gear portion coincides with the peripheral gear with respect to the optical axis direction.

It is desirable for the peripheral gear to include an offset gear portion which is forwardly offset in the optical axis direction, with respect to the remainder of the peripheral gear, over a section extending in front of the large-diameter-gear accommodating recess.

It is desirable for the rotational ring to be positioned at the rearward movement extremity when the lens barrel is at an accommodated position, and for the rotational ring to move in a forward optical axis direction from the rearward movement extremity when the lens barrel moves to a ready-to-photograph state.

It is desirable for the rotational ring to be a cam ring which is provided with at least one cam groove via which an optical-element holding member, provided with at least one cam follower that is engaged in the cam groove, is guided to move in the optical axis direction relative to the cam ring when the cam ring is rotated.

It is desirable for the circumferential length of the large-diameter-gear accommodating recess of the rotational ring is determined so as to include a tolerance that is larger than the diameter of said large-diameter gear portion.

According to the present invention, a compact (small) gear reduction mechanism can be achieved by providing a rotational-ring drive gear that includes a large-diameter gear portion in addition to a long gear portion. Furthermore, the position (with respect to the optical axis direction) of the large-diameter gear portion coincides with the position of a peripheral gear of the rotational ring at the rear movement extremity of the rotational ring so that the large-diameter gear portion is positioned (accommodated) within a large-diameter-gear accommodation recess provided in the rotational ring, in order to prevent the large-diameter gear from interfering with the rotational ring. Accordingly, a more compact gear reduction mechanism can be achieved that does not restrict the amount of movement of a rotational ring in the direction of the rotational axis thereof (optical axis of the lens barrel).

The present disclosure relates to subject matter contained in Japanese Patent Application No. 2009-159325 (filed on Jul. 3, 2009) which is expressly incorporated herein in its entirety.

BRIEF DESCRIPTION OF THE DRAWINGS

The present invention will be discussed below in detail with reference to the accompanying drawings, in which:

FIG. 7 is a developed plan view of a cylindrical portion of the housing and a rear end portion of the cam ring, and also shows a cam-ring drive gear;

FIG. 8A is a developed plan view of the rear end portion of the cam ring showing the relative positions between the cam ring and the cam-ring drive gear at the fully-retracted (accommodated) position, the wide-angle extremity and the telephoto extremity of the zoom lens barrel;

FIG. 8B is a developed plan view of the rear end portion of the cam ring showing the relative positions between the cam ring and the cam-ring drive gear at an assembly/disassembly position of the zoom lens barrel;

DESCRIPTION OF THE EMBODIMENTS

Figure 1:
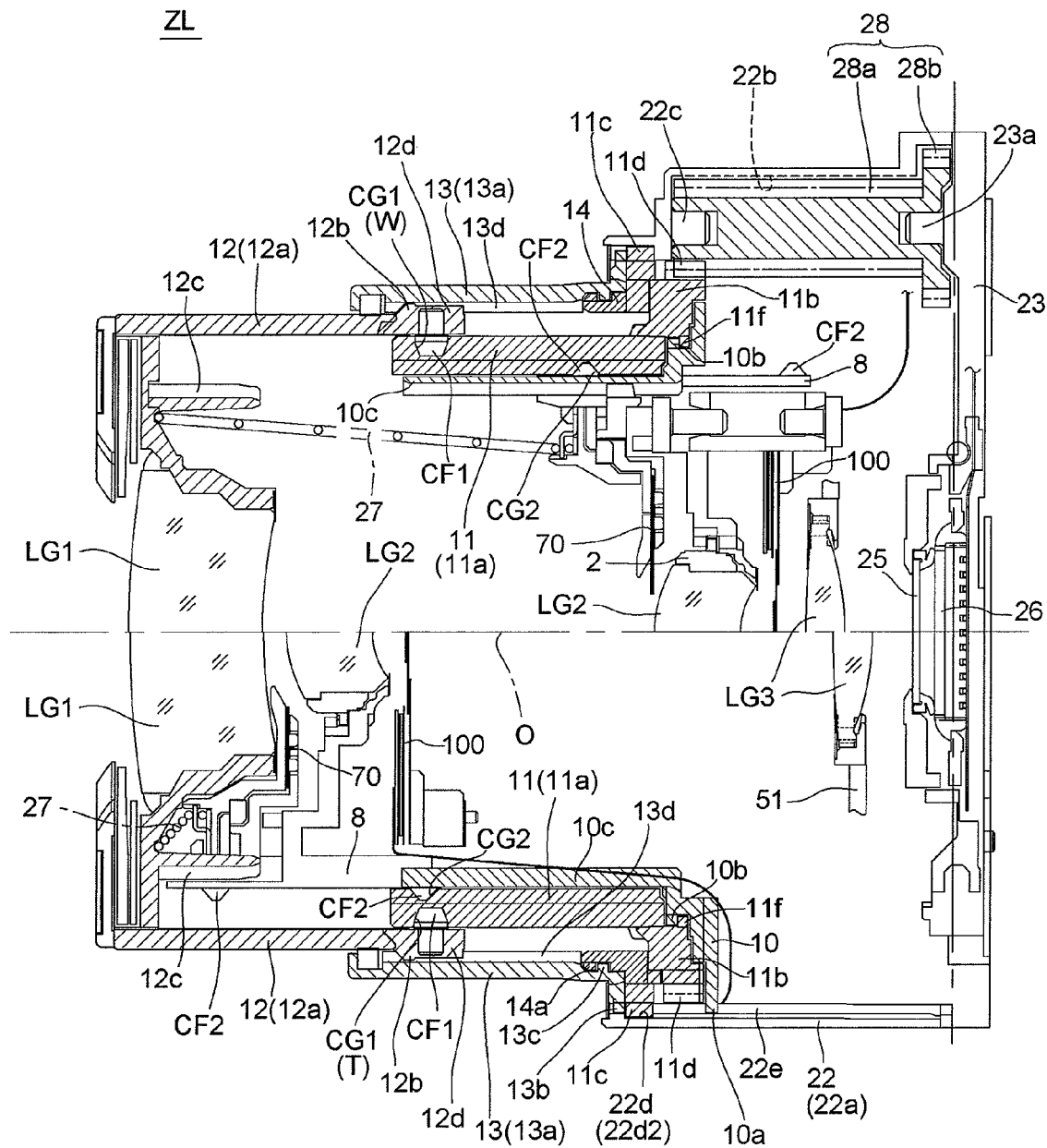
FIG. 1 is a cross sectional view of an embodiment of a zoom lens barrel provided with a rotationally extendable structure, according to the present invention, in a ready-to-photograph state within the zooming range (specifically, the upper half and the lower half of the zoom lens barrel show the zoom lens barrel at the wide-angle extremity and the telephoto extremity, respectively)
Figure 2:
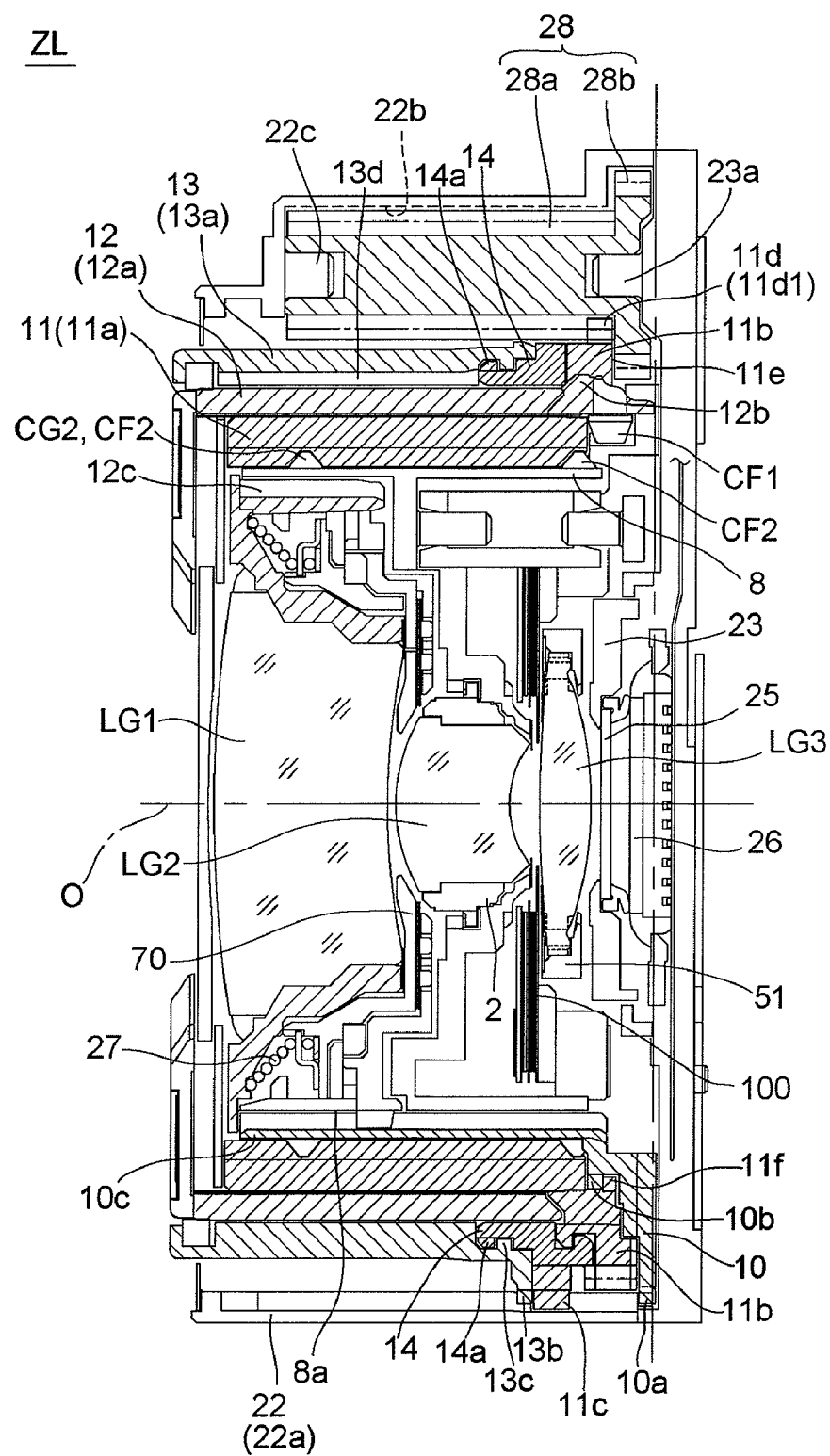
FIG. 2 is a cross sectional view of the zoom lens barrel in a lens barrel accommodated state (fully retracted state)

FIGS. 1 and 2 show an embodiment of a zoom lens barrel ZL that is provided with a rotationally extendable structure, according to the present invention. The photographing optical system of the zoom lens barrel ZL is provided with a first lens group LG1, a second lens group LG2, a third lens group LG3, a low-pass filter (optical filter) 25 and an image sensor (image pickup device) 26, in that order from the object side. In the following descriptions, an "optical axis direction" refers to a direction along or parallel to the optical axis O of the photographing optical system; a "forward direction" refers to a forward optical axis direction (toward the object side), and a "rearward direction" refers to a rearward optical axis direction (toward the image side).

The low-pass filter 25 and the image sensor 26 are integrated as a single unit that is fixed to an image sensor holder 23, and the image sensor holder 23 is fixed to the back of a housing (stationary ring) 22 of the zoom lens barrel ZL.

The third lens group frame 51 which holds the third lens group LG3 is supported by the housing 22 to be movable in the optical axis direction relative to the housing 22. The third lens group frame 51 is driven by an AF motor 160 that is supported by the housing 22 (see FIG. 3).

Figure 3:
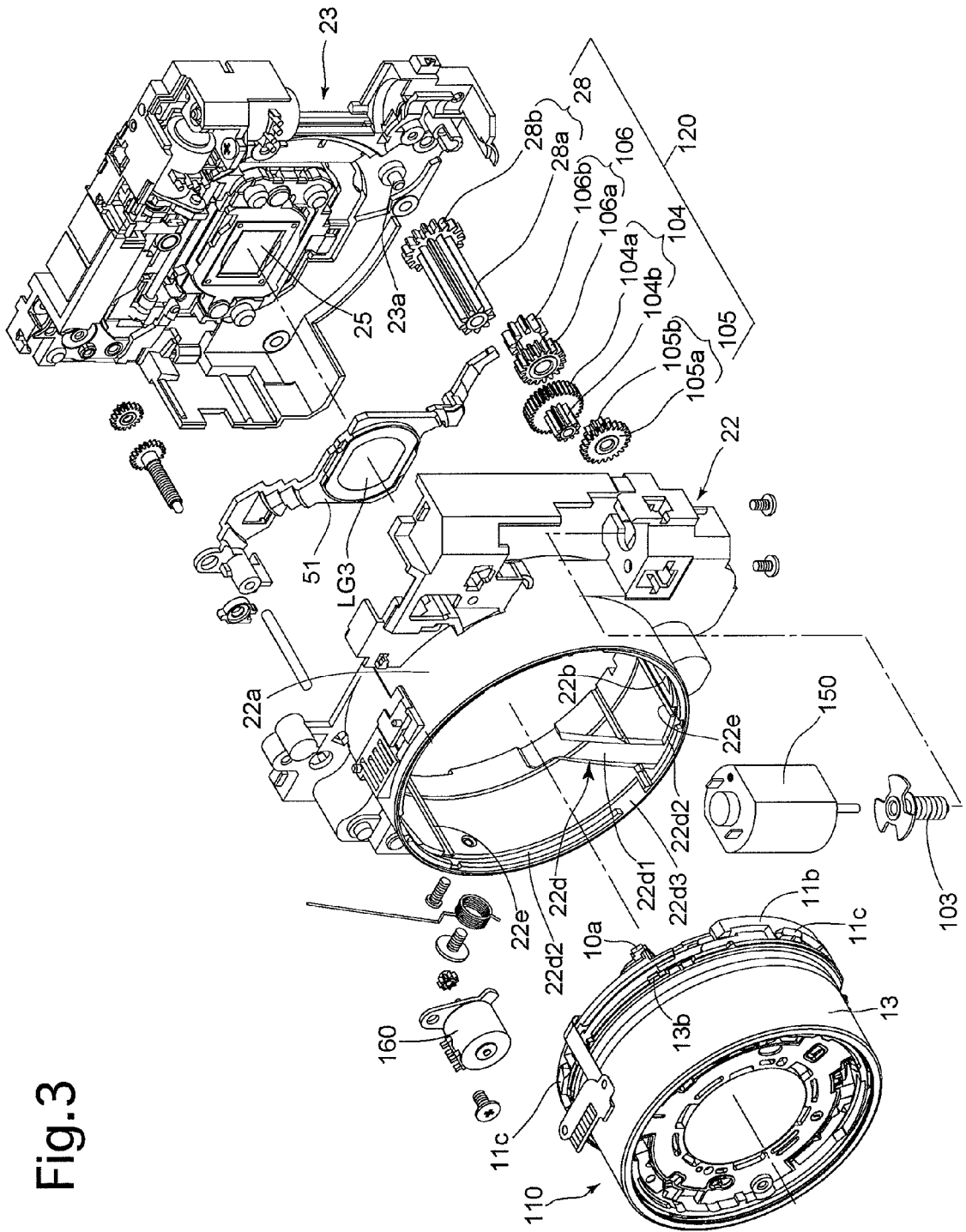
FIG. 3 is an exploded front perspective view of components of the zoom lens barrel, including a housing, an image sensor holder and a moveable lens unit.
Figure 4:
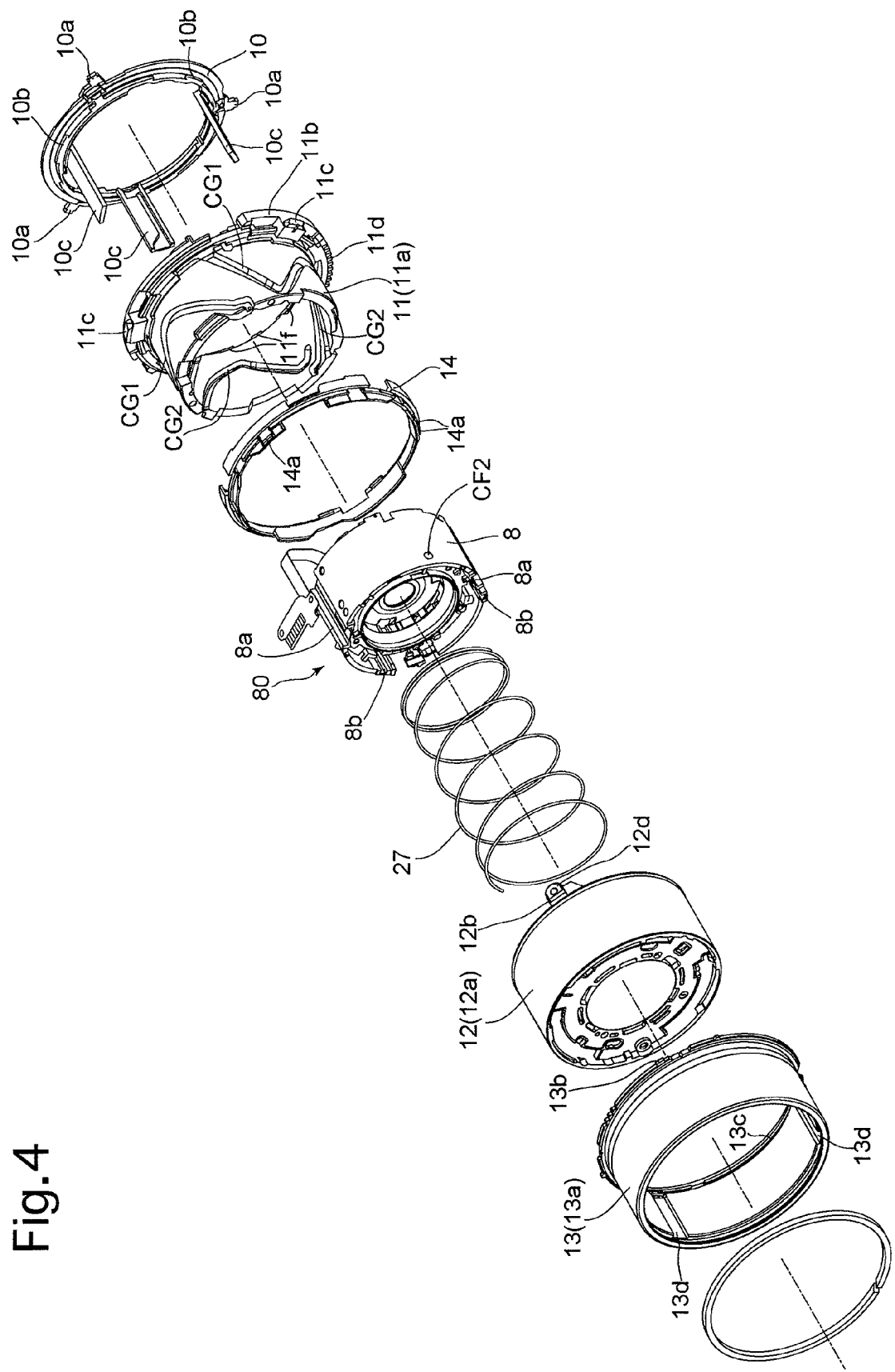
FIG. 4 is an exploded front perspective view of components of the moveable lens unit.

As shown in FIG. 3, the housing 22 is provided with a cylindrical portion 22a, and a movable lens unit 110 is supported inside the cylindrical portion 22a of the housing 22 to be movable in the optical axis direction. As shown in FIG. 4, the movable lens unit 110 is provided with a linear guide ring 10 (for linearly guiding the second lens group LG2), a cam ring (rotational ring) 11, a second advancing barrel (optical-element holding member) 12, a first advancing barrel 13, a cam-ring connecting ring 14 and a second lens group holding unit 80.

The movable lens unit 110 is rotated by the driving force of a zoom motor 150 (see FIG. 3). As shown in FIG. 3, the zoom motor 150 which rotatably drives a worm gear 103 in forward and reverse directions is supported by the housing 22, and a zoom gear train 120 that transmits the driving force of the zoom motor 150 is supported in between the housing 22 and the image sensor holder 23. As shown in FIGS. 11A through 11D, the zoom gear train 120 carries out rotational transmission from a first gear 104 that meshes with the worm gear 103 to a cam-ring drive gear (rotational-ring drive gear) 28 via a second gear 105, and a third gear 106. The rotational axis of the worm gear 103 is substantially orthogonal to the optical axis O; however, the rotation of the worm gear 103 is orthogonally converted by the first gear 104 and transmitted from the first gear 104 to the cam-ring drive gear 28 via each gear (via the second gear 105 and the third gear 106), of the zoom gear train 120, which is supported to rotate about a rotational axis that is substantially parallel to the optical axis O. As shown in FIG. 3, each of the first gear 104, the second gear 105 and the third gear 106 is a double gear which has a large-diameter gear and a small-diameter gear that have different numbers of teeth and are coaxially arranged. A large-diameter gear 104a of the first gear 104 is in mesh with the worm gear 103, a small-diameter gear 104b of the first gear 104 is in mesh with a large-diameter gear 105a of the second gear 105, and a small-diameter gear 105b of the second gear 105 is in mesh with a large-diameter gear 106a of the third gear 106.

The cam-ring drive gear 28 is also formed as a double gear in which a long gear portion 28a and a large-diameter gear portion 28b that have different numbers of teeth are coaxially arranged and integrally formed. The large-diameter gear portion 28b is provided at the rear end of the long gear portion 28a in the optical axis direction and is greater in diameter than that of the long gear portion 28a. A small-diameter gear 106b of the third gear 106 is in mesh with the large-diameter gear portion 28b, and hence, the rotational driving force of the zoom motor 150 is transmitted to the cam-ring drive gear 28. As will be described later, the long gear portion 28a is formed long enough in the optical axis direction so as to be capable of meshing with a peripheral gear 11d of the cam ring 11 throughout the movement range of the cam ring 11 in the optical axis direction. As shown in FIGS. 1, 2 and 7, a long-gear accommodating portion 22b for accommodating the long gear portion 28a is formed in the housing 22. As shown in FIGS. 1 through 3, a front end of the long-gear accommodating portion 22b is provided with shaft projection 22c, and a shaft projection 23a that is positioned rearwardly with respect to the shaft projection 22c is provided on the image sensor holder 23. The front and rear portions of the cam-ring drive gear 28 are respectively supported by the shaft projection 22c and the shaft projection 23a. The cam-ring drive gear 28 is exposed inside the cylindrical portion 22a of the housing 22 while being supported at each end thereof by the shaft projection 22c and the shaft projection 23a, respectively.

Figure 5:
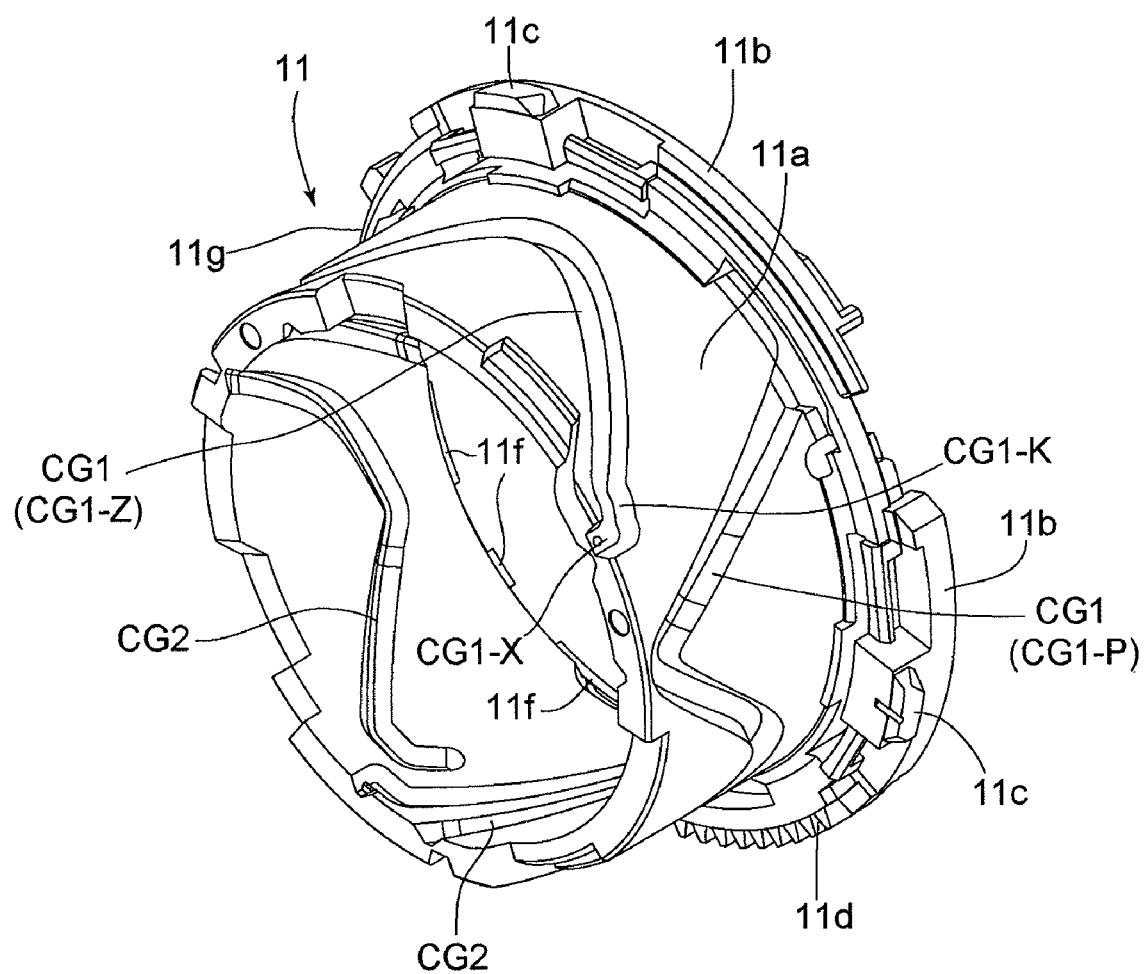
FIG. 5 is a front perspective view of a cam ring, which is a component of the zoom lens barrel.
Figure 9:
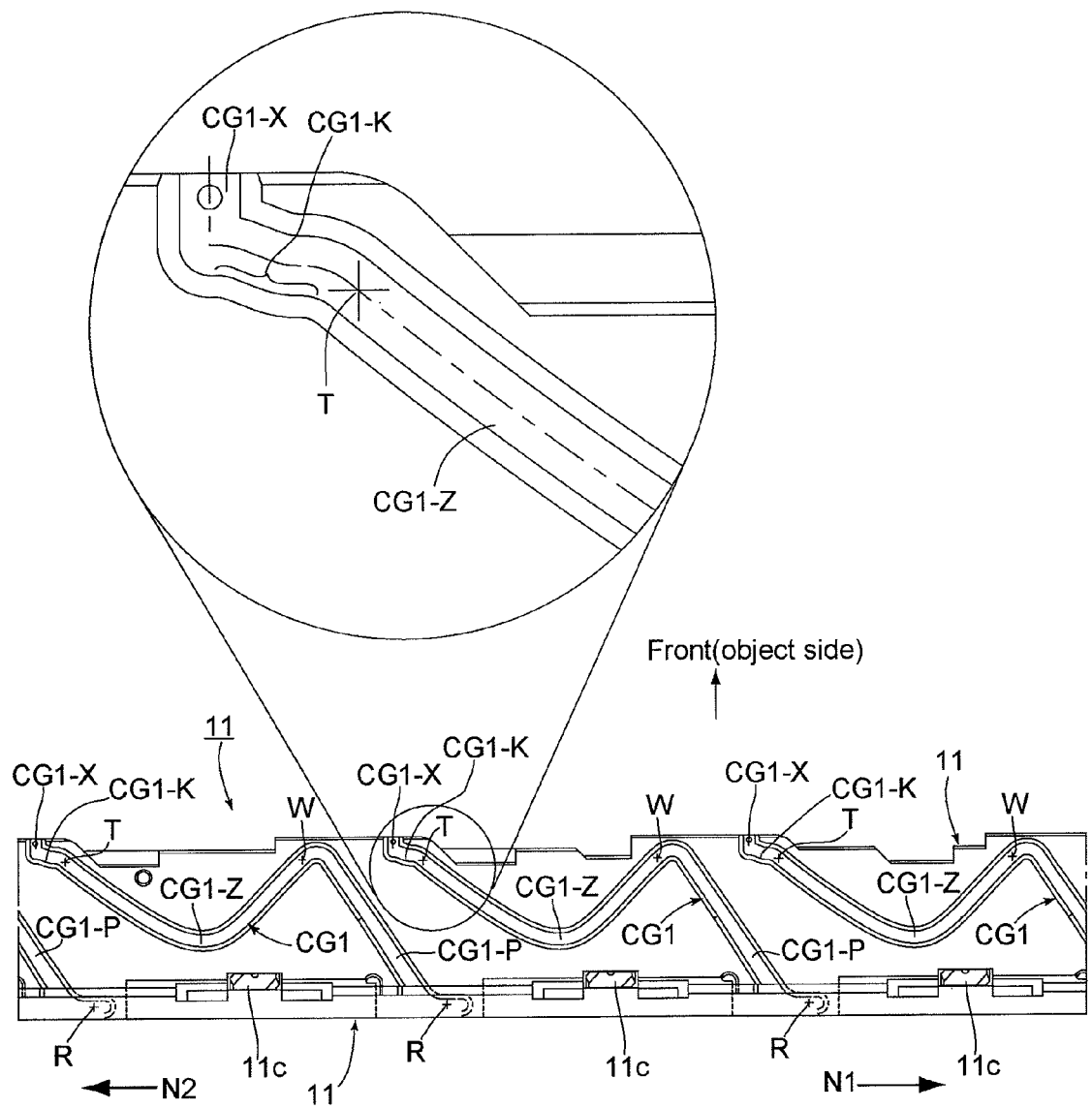
FIG. 9 is a developed plan view of the cam ring.

As shown in FIGS. 5 and 9, the cam ring 11 is provided with a cylindrical portion 11a having a central axis that is substantially coincidental with the optical axis O, and a rear flange 11b which projects in an outer radial direction at the rear end of the cylindrical portion 11a. Three guide projections 11c, which slidably engage with three cam guide-grooves 22d that are formed on the inner peripheral surface of the cylindrical portion 22a of the housing 22, are provided on the rear flange 11b of the cam ring 11. As shown in FIGS. 3 and 7, the cam guide-grooves 22d are each provided with a lead groove 22d1 that is inclined with respect to the optical axis direction and a semi-circumferential groove 22d2 that is connected with the front end of the corresponding lead groove 22d1; the semi-circumferential grooves 22d2 extend along the inner periphery of the cylindrical portion 22a and are centered about a point on the optical axis O. The rear flange 11b is further provided with the (aforementioned) peripheral gear 11d at a rearward position thereon so as not to interfere with the guide projections 11c, and (as briefly mentioned above) the long gear portion 28a of the cam-ring drive gear 28 is in mesh with this peripheral gear 11d. Upon the rotational driving force of the zoom motor 150 being transmitted from the long gear portion 28a of the cam-ring drive gear 28, which is the final gear of the zoom gear train 120, to the cam ring 11 via the peripheral gear 11d, the cam ring 11 rotatably moves along the optical axis O from the fully-retracted state of the zoom lens barrel ZL (of FIG. 2) to within a zooming range (from the wide-angle extremity shown in the upper half of FIG. 1 to the telephoto extremity shown in the lower half of FIG. 1) in a ready-to-photograph state with the guide projections 11c being guided by the lead grooves 22d1, respectively; the cam ring 11 rotates at a fixed position with respect to the optical axis with the guide projections 11c being guided by the semi-circumferential grooves 22d2 when the zoom lens barrel ZL is in the zooming range. A large-diameter-gear accommodating recess 11e is formed in the rear end of the cam ring 11 (see FIG. 7). More specifically, the large-diameter-gear accommodating recess 11e is formed as a cut-out recess from the rear flange 11b so that a rear end-face portion of the peripheral gear 11d is recessed (shifted) forward. Out of the peripheral gear 11d, the area thereof that is positioned in front of the large-diameter-gear accommodating recess 11e is provided as an offset gear portion 11d1 formed at a position forwardly offset compared to the remainder of the peripheral gear 11d.

The first advancing barrel 13 is positioned in front of the cam ring 11 (specifically, a combination of the cam ring 11 and the cam-ring connecting ring 14) and the linear guide ring 10 is position behind the cam ring 11. The first advancing barrel 13 is linearly guided so as to be relatively moveable in the optical axis direction with respect to the housing 22 via the slidable engagement of three linear-guide projections 13b (only one of which are shown in FIG. 4) that each project in a radially outer direction at the rear end of a cylindrical portion 13a, which has a central axis substantially coinciding with the optical axis O, of the first advancing barrel 13 with three linear guide grooves 22e (only two of which are shown in FIG. 3) that are formed in the inner peripheral surface of the cylindrical portion 22a of the housing 22. Similarly, the linear guide ring 10 is linearly guided so as to be relatively moveable in the optical axis direction with respect to the housing 22 via the slidable engagement of three linear guide projections 10a, which project in a radially outer direction at the rear end of the linear guide ring 10, with the linear guide grooves 22e. The linear guide ring 10 is provided with rotational guide prongs 10b which engage with rotational guide prongs 11f that are formed on the inner periphery of at a rear portion of the cam ring 11; and hence, according to this engagement (bayonet coupling), the linear guide ring 10 is connected with the cam ring 11 so as to be relatively rotatable with respect to the cam ring 11 and to move together with the cam ring 11 in the optical axis direction. The first advancing barrel 13 is connected with the cam ring 11 to be relatively rotatable with respect to the cam ring 11 and to move together with the cam ring 11 in the optical axis direction by the slidable engagement (bayonet coupling) of rotational guide prongs 14a, provided on the outer periphery of the cam-ring connecting ring 14 that is connected with the cam ring 11, with rotational guide prongs 13c formed on the inner periphery at a rear portion of the cylindrical portion 13a. In other words, the linear guide ring 10, the cam ring 11 and the first advancing barrel 13 integrally move in the optical axis direction; and the cam ring 11 is relatively rotatable with respect to both the linear guide ring 10 and the first advancing barrel 13, the linear guide ring 10 and the first advancing barrel 13 being linearly guided in the optical axis direction with respect to the housing 22.

The linear guide ring 10 guides the second lens group holding unit 80 (see FIG. 4) linearly in the optical axis direction so that the second lens group holding unit 80 can move in the optical axis direction relative to the linear guide ring 10. The linear guide ring 10 is provided with three linear guide bars 10c which project forwardly in the optical axis direction. The second lens group holding unit 80 is provided with a second lens group moving frame (optical element holding member) 8, and is provided inside the second lens group moving frame 8 with a second lens group holding frame 2 which holds the second lens group LG2 (see FIGS. 1 and 2). The second lens group moving frame 8 is provided on the outer periphery thereof with three linear guide grooves 8a (only two of which are shown in FIG. 4) that extend in the optical axis direction. The second lens group moving frame 8 is linearly guided by the linear guide ring 10 via the slidable engagement of the linear guide bars 10c with the linear guide grooves 8a. The second lens group holding unit 80 is provided, in front of and behind the second lens group holding frame 2 in the optical axis direction, with a variable aperture-stop mechanism 70 and a shutter unit 100, respectively, each of which is supported by the second lens group moving frame 8 to be movable in the optical axis direction relative to the second lens group moving frame 8 (see FIGS. 1 and 2).

Figure 6:
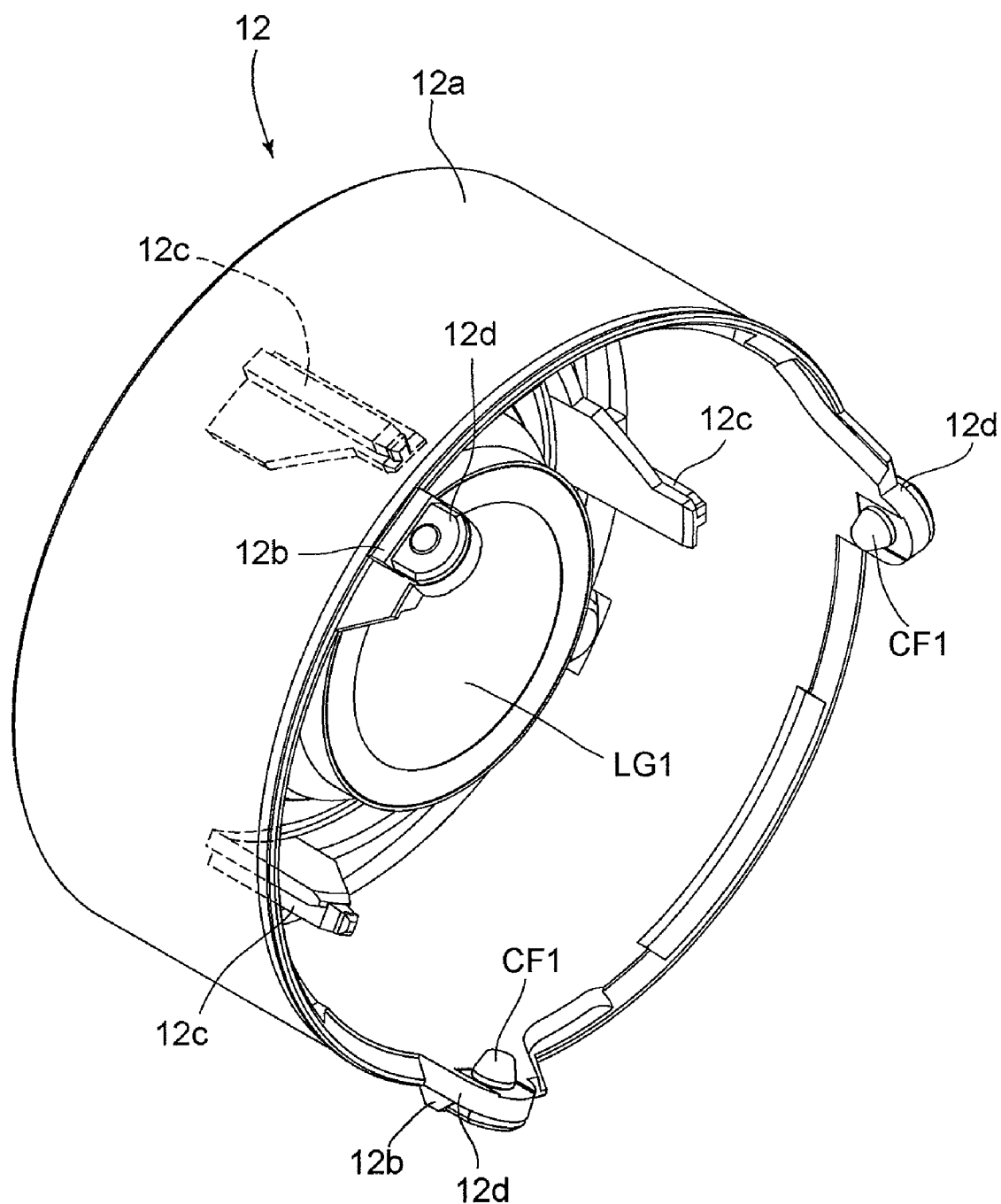
FIG. 6 is a rear perspective view of a second advancing barrel, which is a component of the zoom lens barrel.

As shown in FIG. 6, the second advancing barrel 12, which holds the first lens group LG1, is provided with three outer linear-guide keys 12b (only two of which are shown in FIG. 6) which project rearwardly from the rear end of a cylindrical portion 12a of the second advancing barrel 12, and three inner linear-guide keys 12c which are supported inside the cylindrical portion 12a and project rearwardly therein. The outer linear-guide keys 12b are engageable with three linear guide grooves 13d (only two of which are shown in FIG. 4) that are formed on the inner peripheral surface of the cylindrical portion 13a of the first advancing barrel 13, and the three inner linear-guide keys 12c are engageable with three linear guide grooves 8b (only two of which are shown in FIG. 4) formed on the inner periphery of the second lens group moving frame 8. Hence, the second advancing barrel 12 is linearly guided in the optical axis direction with respect to the housing 22 due to the slidable-engagement of the linear guide grooves 13d and 8b with the linear-guide keys 12b and 12c, respectively.

As shown in FIG. 6, the second advancing barrel 12 is provided with three cam-follower holding seats 12d, formed behind the three outer linear-guide keys 12b. The three cam-follower holding seats 12d are provided at different positions in the circumferential direction of the second advancing barrel 12. Each of three the cam-follower holding seats 12d supports a first cam follower CF1 that projects radially inwards, and each of the three first cam followers CF1 is slidably engaged with a corresponding first-lens-group control cam groove CG1 formed on the outer periphery of the cylindrical portion 11a of the cam ring 11. Since the second advancing barrel 12 is linearly guided in the optical axis direction via the first advancing barrel 13 and the second lens group moving frame 8, rotation of the cam ring 11 causes the second advancing barrel 12 (and hence, the first lens group LG1) to move in the optical axis direction in a predetermined moving manner in accordance with the contours of the first-lens-group control cam grooves CG1, by which the first cam followers CF1 receive guidance; accordingly, the movement of the first lens group LG1 in the optical axis direction is controlled in such a manner. The designators "R", "W" and "T" shown in FIG. 9 indicate the positions of the first cam followers CF1 in the first-lens-group control cam grooves CG1 at the accommodated position (FIG. 2), the wide-angle extremity (upper half of FIG. 1) and the telephoto extremity (lower half of FIG. 1), of the zoom lens barrel ZL, respectively. Furthermore, CG1-P designates an accommodation control section of each first-lens-group control cam groove CG1 that extends from the accommodated position R to the wide-angle position W, and CG1-Z designates a zooming-control section of each first-lens-group control cam groove CG1 that extends from the wide-angle position W to the telephoto position T. Furthermore, each of the first-lens-group control cam grooves CG1 is provided with an assembly/disassembly section CG1-X immediately before the corresponding telephoto position T. Each end of the assembly/disassembly sections CG1-X is open at the front end surface of the cylindrical portion 11a of the cam ring 11, and the first cam followers CF1 can be respectively inserted and removed via the open ends of the assembly/disassembly sections CG1-X.

The second lens group moving frame 8 is provided on an outer peripheral surface thereof with a plurality of second cam followers CF2, each of which projects radially outwards to be slidably engaged in an associated second-lens-group control cam groove CG2 formed on an inner peripheral surface of the cam ring 11. Since the second lens group moving frame 8 is linearly guided in the optical axis direction via the linear guide ring 10, rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel ZL is provided between the second lens group moving frame 8 and the second advancing barrel 12 with an inter-lens-group biasing spring 27, in the form of a compression spring which biases the second lens group moving frame 8 and the second advancing barrel 12 in opposite directions away from each other.

Operations of the zoom lens barrel ZL that has the above described structure will be discussed hereinafter. In the lens barrel accommodated state shown in FIG. 2, the length of the optical system in the optical axis direction (the distance from the front surface (object-side surface) of the first lens group LG1 to the imaging surface of the image sensor 26) is shorter than that in a ready-to-photograph state shown in FIG. 1. In the lens barrel accommodated state, the cam ring 11 is positioned at the rearward movement extremity in the optical axis direction, and the cam-ring drive gear 28 is positioned as shown in FIGS. 8A (accommodated position), 10A and 11A. In other words, the cam-ring drive gear 28 and the peripheral gear 11d are in mesh with each other via the rear end portion of the long gear portion 28a (near the boundary between the long gear portion 28a and the large-diameter gear portion 28b) and the offset gear portion 11d1 that is in front of the large-diameter-gear accommodating recess 11e. Furthermore, the large-diameter gear portion 28b enters into the large-diameter-gear accommodating recess 11e, and the large-diameter gear portion 28b coincides with part of the peripheral gear 11d with respect to the optical axis direction. In other words, the large-diameter gear portion 28b and a rear portion of the peripheral gear 11d are positioned on a common plane that is orthogonal to the optical axis O. Accordingly, the cam ring 11 can be retracted more rearwardly in the optical axis direction without interfering with the large-diameter gear portion 28b. At this fully-retracted (accommodated) position of the cam ring 11, the first cam followers CF1 are positioned at the accommodated positions R.

In the lens barrel accommodated state, immediately after a transition signal for transition from the lens barrel accommodated state to a ready-to-photograph state (e.g., turning ON a main switch of the camera in which the zoom lens barrel ZL is incorporated) is input to the zoom lens barrel ZL, the zoom motor 150 is driven in the lens barrel advancing direction, which causes the rotation of the worm gear 103 to transmit to the cam ring 11 via the zoom gear train 120 while the rotational speed thereof is reduced thereby. The cam-ring drive gear 28, which constitutes a double gear, itself also has a gear-reduction capability which further reduces the speed of the rotation that is transmitted from the third gear 106 to the large-diameter gear portion 28b, and this speed-reduced rotation is transmitted from the long gear portion 28a to the peripheral gear 11d. Accordingly, the cam ring 11, to which this rotational driving force is transmitted, advances forwardly in the optical axis direction with respect to the housing 22 via the engagement between the lead groove 22d1 of the cam guide-grooves 22d and the guide projections 11c of the cam ring 11. The rotational direction of the cam ring 11 when the cam ring 11 (and hence the zoom lens barrel ZL) advances forward is indicated by an arrow N1 in FIGS. 8A, 9, 10A, 10B, and 11A through 11D. Since the cam ring 11 rotates while advancing in the forward direction with respect to the cam-ring drive gear 28 that rotates at a fixed position, with respect to the optical axis direction, the position at which the long gear portion 28a is in mesh with the peripheral gear 11d gradually advances in the forward direction, and hence, the large-diameter-gear accommodating recess 11e of the cam ring 11 moves forward and away from the coinciding position thereof with the large-diameter gear portion 28b. Until the large-diameter-gear accommodating recess 11e completely moves away from the large-diameter gear portion 28b (so that the large-diameter gear portion 28b is relatively moved completely out of the large-diameter-gear accommodating recess 11e), the cam ring 11 is rotated by a predetermined rotational angle so that the circumferential position of the large-diameter-gear accommodating recess 11e changes relative to the large-diameter gear portion 28b; however, the range (length) of the large-diameter-gear accommodating recess 11e in the circumferential direction thereof is determined so as to include a tolerance that is much larger than the diameter of the large-diameter gear portion 28b so that the peripheral gear 11d (the rear flange 11b) and the large-diameter gear portion 28b do not interfere with each other during the rotation of the cam ring 11 until the large-diameter-gear accommodating recess 11e completely moves away from the large-diameter gear portion 28b. The linear guide ring 10 and the first advancing barrel 13 move forwardly in the optical axis direction together with the cam ring 11.

Upon the cam ring 11 rotating in the barrel-advancing direction N1, the second advancing barrel 12, which is provided on the outer periphery of the cam ring 11 and is linearly guided via the second lens group moving frame 8 and the first advancing barrel 13, advances forwardly in the optical axis direction with respect to the integral combination of the cam ring 11, the first advancing barrel 13 and the linear guide ring 10, via the first cam followers CF1 moving within the accommodation control sections CG1-P of the first-lens-group control cam grooves CG1, so that the amount of extension (telescoping amount) of the cylindrical portion 12a of the second advancing barrel 12 from the first advancing barrel 13 gradually increases. Additionally, when the cam ring 11 is rotated, the second lens group moving frame 8, which is provided inside the cam ring 11 and is linearly guided by the linear guide ring 10, moves in the optical axis direction in a predetermined moving manner (that is different from that of the second advancing barrel 12) with respect to the cam ring 11 in accordance with the engagement of the second cam followers CF2 with the second-lens-group control cam grooves CG2.

Subsequently, the zoom lens barrel ZL is advanced forwardly by a predetermined amount to reach the wide-angle extremity within the zooming range, as shown in the upper half of the cross sectional view of FIG. 1. In a ready-to-photograph state within the zooming range, the guide projections 11c of the cam ring 11 are positioned within the semi-circumferential grooves 22d2 of the cam guide-grooves 22d, so that the cam ring 11 does not move any further in the optical axis direction relative to the housing 22. As shown in FIG. 8A, at the wide-angle extremity, the peripheral gear 11d of the cam ring 11 is in mesh with the front end portion of the long gear portion 28a of the cam-ring drive gear 28. Furthermore, at the wide-angle extremity, as shown in FIG. 9, the first cam followers CF1 are each positioned at the wide-angle position W of each corresponding first-lens-group control cam groove CG1.

Figure 10A:
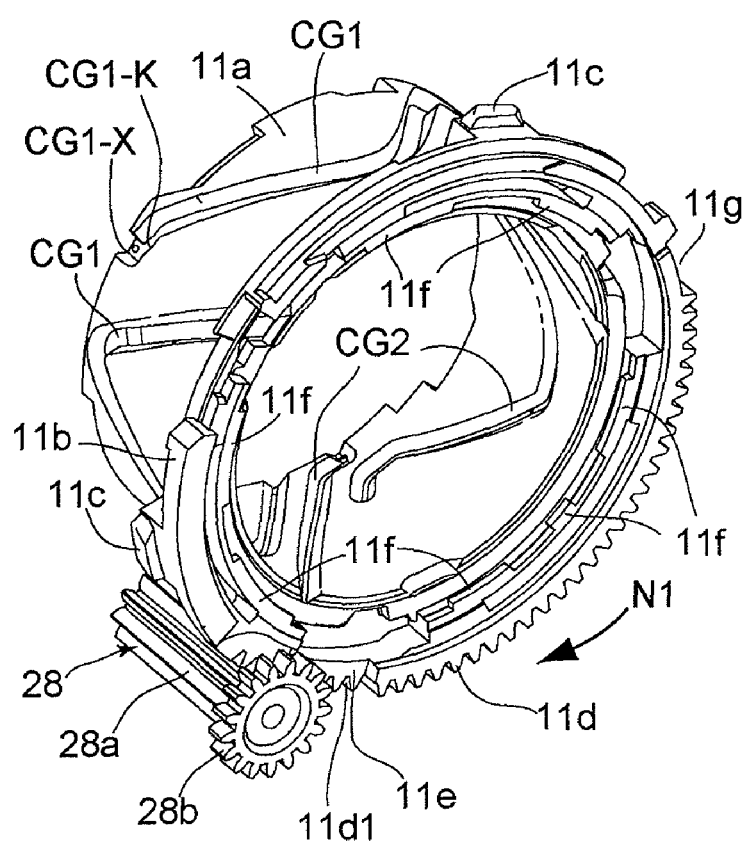
FIG. 10A is a rear perspective view of the cam ring and the cam-ring drive gear, showing the relative positions therebetween at the fully-retracted (accommodated) state of the zoom lens barrel.
Figure 10B:
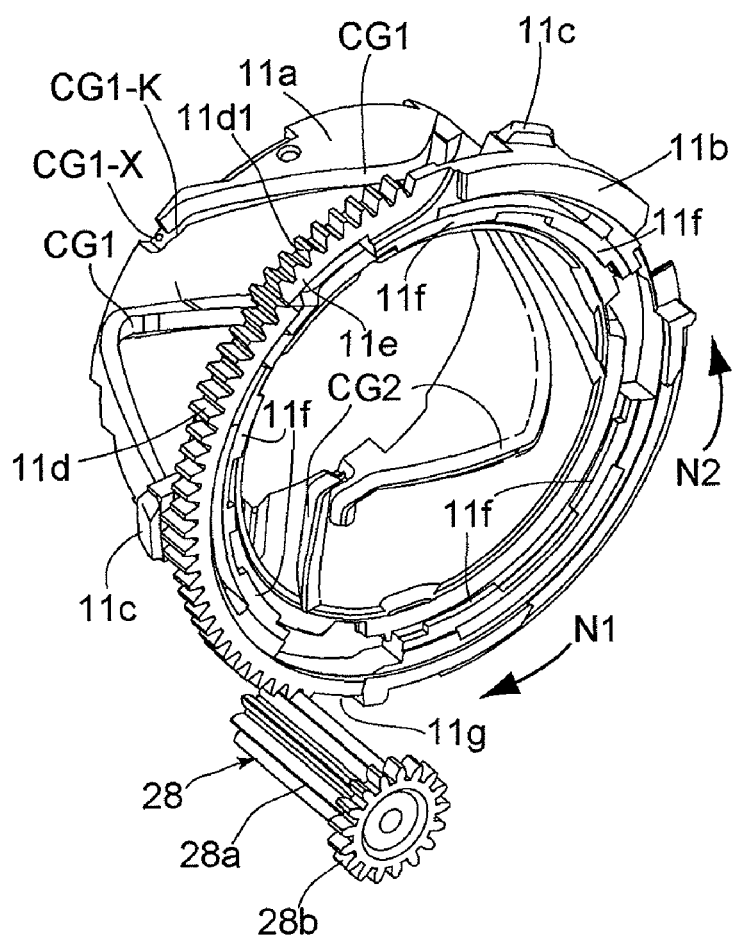
FIG. 10B is a rear perspective view of the cam ring and the cam-ring drive gear, showing the relative positions therebetween at the telephoto extremity of the zoom lens barrel.

The amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 along the photographing optical axis O while changing the air distance therebetween. Driving the zoom motor 150 in a barrel-advancing direction so as to advance the zoom lens barrel ZL from the lens barrel accommodated state firstly causes the zoom lens barrel ZL to move to the wide-angle extremity shown in the upper half of the cross sectional view in FIG. 1, and further driving the zoom motor 150 in the same direction causes the zoom lens barrel ZL to move to the telephoto extremity shown in the lower half of the cross sectional view in FIG. 1. In the zooming range between the wide-angle extremity and the telephoto-extremity, the cam ring 11 rotates at a fixed position, with respect to the optical axis direction, without moving in the optical axis direction while the guide projections 11c of the cam ring 11 are guided by the semi-circumferential groove 22d2 of the cam guide-grooves 22d. Accordingly, the peripheral gear 11d does not change its position in the optical axis direction relative to the long gear portion 28a of the cam-ring drive gear 28 in the zooming range, and as shown in FIGS. 8A and 10B, the front end portion of the long gear portion 28a continues to be in mesh with the peripheral gear 11d from the wide-angle extremity to the telephoto extremity while applying a rotational driving force on the cam ring 11. The position of the first lens group LG1, within the zooming range, with respect to the optical axis direction is controlled by the engagement of the first cam follower CF1 with the zooming-control section CG1-Z of the first-lens-group control cam grooves CG1; and at the telephoto extremity, the first cam follower CF1 reaches the telephoto position T of the first-lens-group control cam grooves CG1 shown in FIG. 9.

Immediately after a transition signal for transition from a ready-to-photograph state to the lens barrel accommodated state (e.g., for turning OFF the aforementioned main switch of the camera in which the zoom lens barrel ZL is incorporated) is input to the zoom lens barrel ZL, the zoom motor 150 is driven in the lens-barrel retracting direction, which causes the zoom lens barrel ZL to perform a lens barrel retracting operation reverse to the above described lens barrel advancing operation. The rotational driving force of the zoom motor 150 is transmitted to the cam ring 11 via the zoom gear train 120 which includes the cam-ring drive gear 28, and the cam ring 11 is rotated in an opposite rotational direction to when the zoom lens barrel ZL is driven in the lens barrel advancing direction. The rotational direction of the cam ring 11 during the lens barrel retracting operation is indicated by an arrow N2 in FIGS. 8A through 9, 10B, 10C, and 11B through 11D. Upon the cam ring 11 being rotated in the barrel-retracting rotational direction N2, when the zoom lens barrel ZL is retracted past the wide-angle extremity, the guide projections 11c are guided by the lead grooves 22d1 of the cam guide-grooves 22d so that the cam ring 11 rotates while moving rearwardly in the optical axis direction. Subsequently, the mesh-engagement position of the peripheral gear 11d with respect to the long gear portion 28a of the cam-ring drive gear 28 gradually moves (changes) in the rearward direction. The first advancing barrel 13 and the linear guide ring 10 are linearly moved rearwardly in the optical axis direction together with the cam ring 11. The second advancing barrel 12, which holds the first lens group LG1, moves further rearward in the optical axis direction relative to the cam ring 11, which is carrying out a rotational retracting operation, due to the first cam followers CF1 provided on the second advancing barrel 12 being guided in the accommodation control sections CG1-P of the first-lens-group control cam grooves CG1, respectively. The second lens group moving frame 8 which holds the second lens group LG2 is moved rearwardly in the optical axis direction relative to the cam ring 11 in a predetermined movement manner that is different from that of the second advancing barrel 12 via the engagement of the second cam followers CF2 with the second-lens-group control cam grooves CG2.

Upon the zoom lens barrel ZL being retracted to the lens barrel accommodation state as shown in FIG. 2, the cam ring 11 arrives at the rearward movement extremity thereof at which the offset gear portion 11d1 of the peripheral gear 11d is in mesh with the rear end portion of the long gear portion 28a of the cam-ring drive gear 28 (i.e., near the boundary between the long gear portion 28a and the large-diameter gear portion 28b). At the rearward movement extremity of the cam ring 11, the circumferential phase (circumferential position with respect to the cam ring 11) of the large-diameter gear portion 28b and the large-diameter-gear accommodating recess 11e coincide, and the large-diameter gear portion 28b has entered into the large-diameter-gear accommodating recess 11e. In other words, as described above, the large-diameter gear portion 28b coincides with a rear part of the peripheral gear 11d with respect to the optical axis direction, so that the cam ring 11 can be rearwardly retracted to the position shown in FIG. 2 without being restricted by the large-diameter gear portion 28b of the cam-ring drive gear 28.

The third lens group frame 51 which holds the third lens group LG3 is moved (driven) forwardly and rearwardly in the optical axis direction by the AF motor 160, independently from the driving of the first lens group LG1 and the second lens group LG2 by the zoom motor 150. When the photographing optical system of the zoom lens barrel ZL is in the zooming range from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera in which the zoom lens barrel ZL is incorporated.

As can be understood from the above descriptions, in the present embodiment of the zoom lens barrel ZL, the cam-ring drive gear 28, which has a necessary length (in the optical axis direction) that corresponds to the movement distance of the cam ring 11 in the optical axis direction, is configured as a double gear provided with the long gear portion 28a which meshes with the peripheral gear 11d of the cam ring 11 and the large-diameter gear portion 28b which is integrally formed with the long gear portion 28a at the rear end of the long gear portion 28a. Since the cam-ring drive gear 28 itself is provided with a gear-reduction capability, the number of gears in the zoom gear train 120 can be reduced so that the zoom gear train 120 can have a more compact structure while attaining a desired gear-reduction ratio. Furthermore, by providing the large-diameter-gear accommodating recess 11e, into which the large-diameter gear portion 28b enters, on the rear end of the cam ring 11, the cam ring 11 can be retracted more rearwardly in the optical axis direction without interfering with the large-diameter gear portion 28b, while the cam-ring drive gear 28 can be provided with a gear-reduction capability and the overall length of the zoom lens barrel ZL in the accommodated position can be reduced (made more compact).

Furthermore, the third gear 106, which transmits the rotational driving force of the zoom motor 150 immediately before the cam-ring drive gear 28, is also a double gear that has a gear-reduction capability. Hence, the third gear 106 also contributes to the reduction in the number of gears in the zoom gear train 120 and the miniaturization (compactness) of the zoom gear train 120. However, unlike in the present invention, if the cam-ring drive gear 28 were to be a long gear that has a constant diameter over the entire axial length thereof without being provided with the large-diameter gear portion 28b, the gear (i.e., a gear corresponding to the third gear 106) with which such a long-gear is in mesh could not be provided with a large diameter gear (corresponding to the large-diameter gear 106a) for gear-reduction at a position coinciding with this long gear with respect to the axial direction (coinciding in a common plane that is orthogonal to the rotational axes of such gears) since the gear corresponding to the third gear 106 would interfere with the long gear. Therefore, in the related art, it is general practice to provide a structure in which the gear which is in mesh with the long gear is an idle gear having no gear-reduction capability. Whereas, in the illustrated embodiment of the present invention, due to the small-diameter gear 106b of the third gear 106 being in mesh with the large-diameter gear portion 28b of the cam-ring drive gear 28, it is possible to provide the large-diameter gear 106a at a position coinciding with the long gear portion 28a with respect to the axial direction (coinciding in a common plane that is orthogonal to the rotational axes of the cam-ring drive gear 28 and the third gear 106). Accordingly, it is possible to provide a gear-reduction capability in the third gear 106 in addition to the cam-ring drive gear 28.

Note that when the large-diameter gear portion 28b is made to enter the large-diameter-gear accommodating recess 11e, by making the offset gear portion 11d1 mesh with the long gear portion 28a, a sufficient mesh-engagement range between the peripheral gear 11d and the cam-ring drive gear 28 can be obtained. Since this offset gear portion 11d1 is formed only at a partial section in the circumferential direction that corresponds to the large-diameter-gear accommodating recess 11e, the entire width in the optical axis direction of the peripheral gear 11d is not enlarged, and hence, the cam ring 11 is not enlarged in the optical axis direction.

The assembly structure of the cam ring 11 and the cam-ring drive gear 28 with respect to the housing 22 will be hereinafter discussed. The three cam guide-grooves 22d formed in the housing 22 are respectively provided with insertion/removal openings 22d3 (see FIGS. 3 and 7) that open at the front edge of the cylindrical portion 22a at the end edges of the semi-circumferential grooves 22d2, respectively. The three guide projections 11c of the cam ring 11 can be respectively inserted into and removed from the cam guide-grooves 22d via the insertion/removal openings 22d3. The rotational position at which the rotational phase of the guide projections 11c and the insertion/removal openings 22d3 coincide designates an assembly/disassembly position of the cam ring 11. A non-gear section 11g, in which the peripheral gear 11d is not provided, is formed on the rear flange 11b of the cam ring 11 at a position so as to face the long-gear accommodating portion 22b when the cam ring 11 is positioned at the assembly/disassembly position. In other words, the rotatable range of the cam ring 11 with respect to the housing 22 is determined by the range (the circumferential range of each cam guide-grooves 22d) in which the guide projections 11c of the cam ring 11 is moved from one end of the cam guide-grooves 22d (the end of the semi-circumferential grooves 22d2 positioned behind the insertion/removal openings 22d3) to the other end thereof (the rear end edge of each lead groove 22d1); however, the peripheral gear 11d is not formed over the entire circumferential range of this rotatable range of the cam ring 11, rather, the non-gear section 11g is formed in a section at one end of this rotatable range (the section at which the guide projections 11c are respectively positioned behind the insertion/removal openings 22d3) of the cam ring 11. Therefore, the cam ring 11 is never rotated to the assembly/disassembly position under the driving control of the zoom motor 150. Furthermore, since the cam ring 11 itself is also covered by the first advancing barrel 13, etc., so that the cam ring 11 is not outwardly exposed, the cam ring 11 cannot be externally grasped by the hand, etc. Therefore, there is no danger of unintentionally rotating the cam ring 11 to the assembly/disassembly position. When the cam ring 11 is removed from the housing 22, a special jig is used to manually rotate the cam ring 11 to the assembly/disassembly position.

Figure 10C:
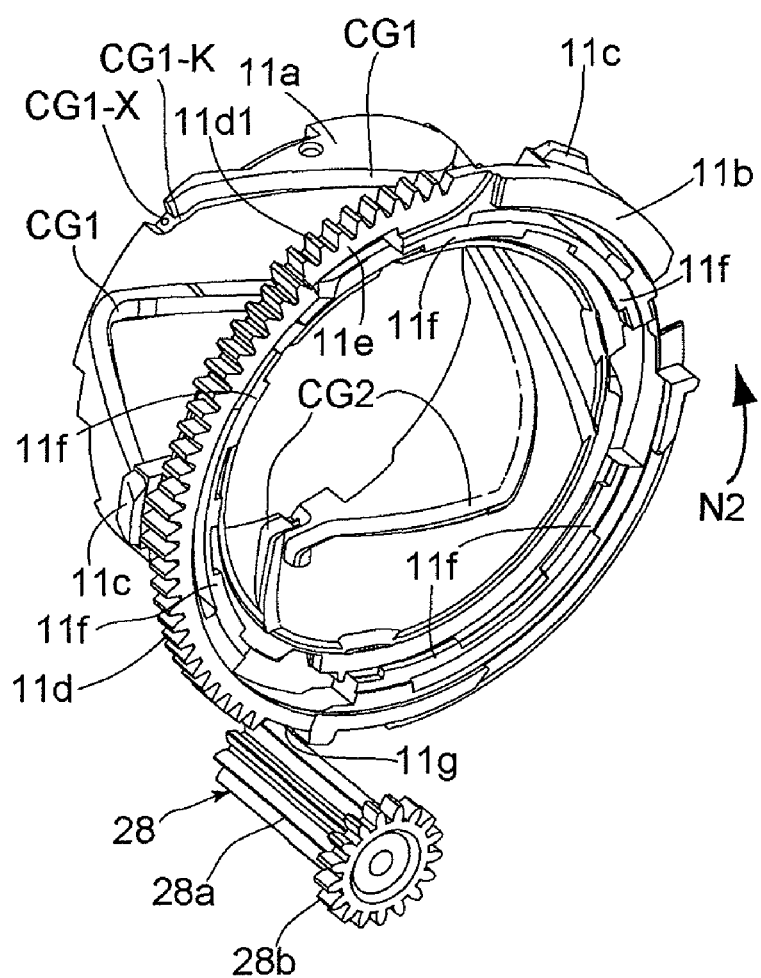
FIG. 10C is a rear perspective view of the cam ring and the cam-ring drive gear, showing the relative positions therebetween at the assembly/disassembly position of the zoom lens barrel.
Figure 11A:
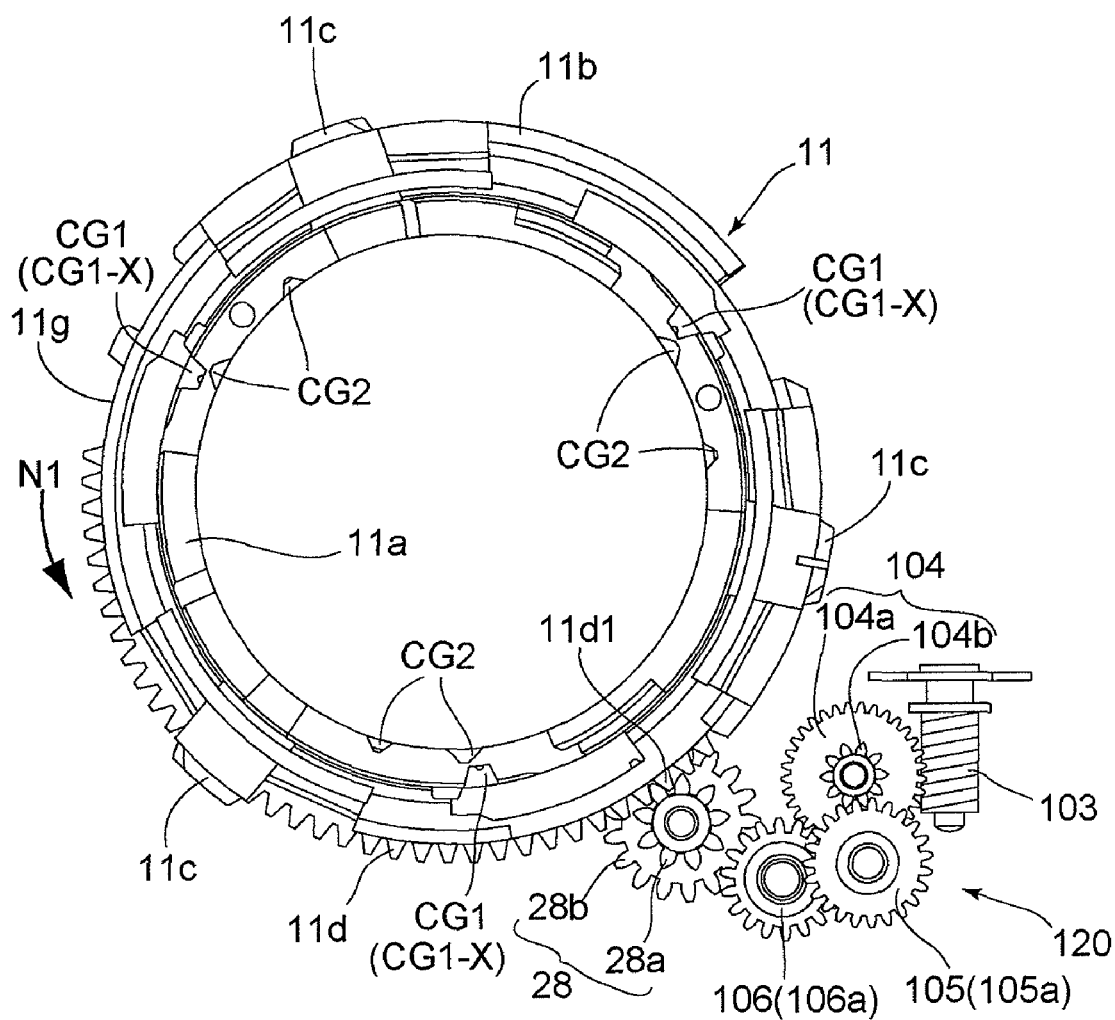
FIG. 11A is a front elevational view of the cam ring and the zoom gear train at the fully-retracted (accommodated) state of the zoom lens barrel.
Figure 11B:
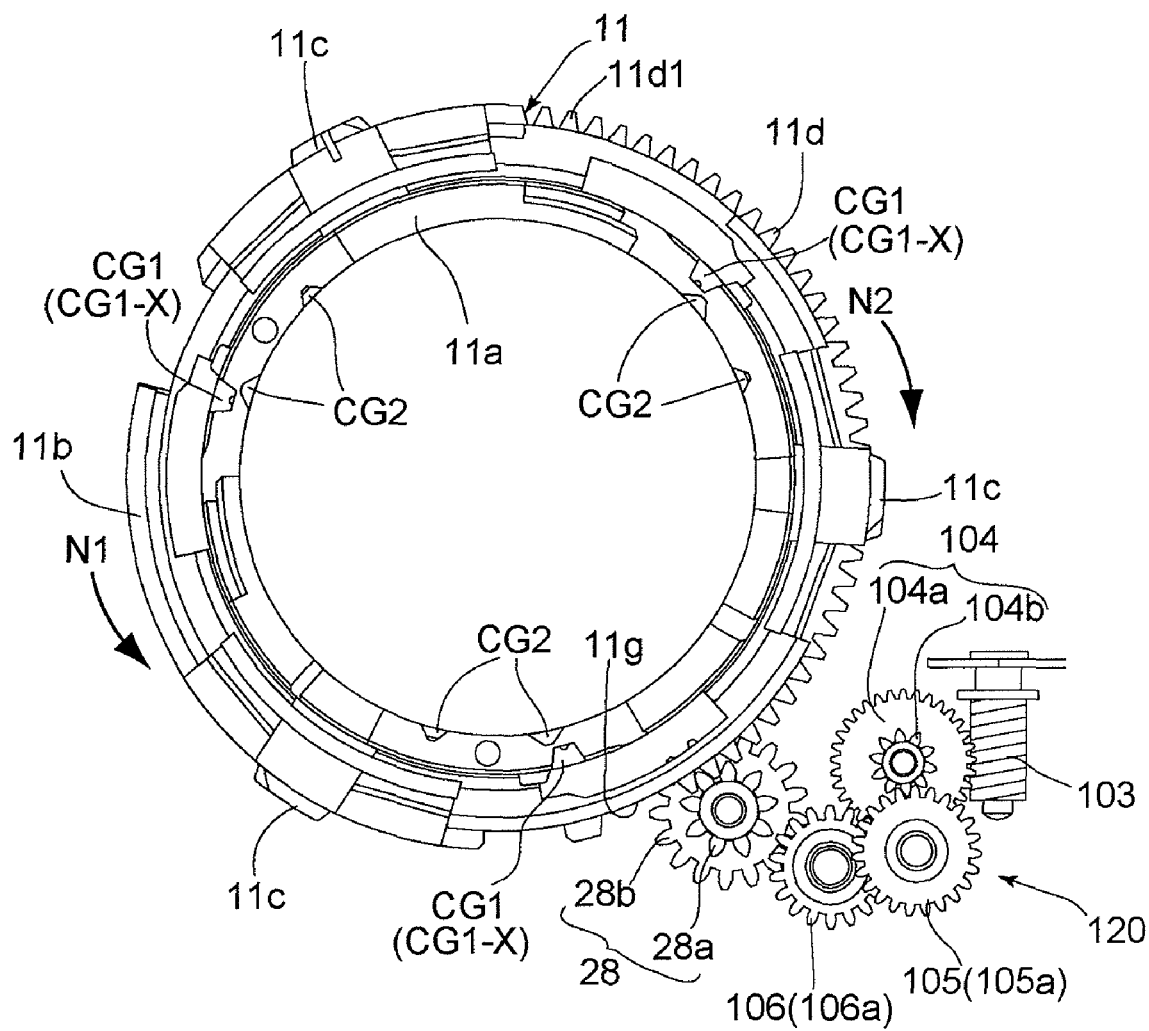
FIG. 11B is a front elevational view of the cam ring and the zoom gear train at the telephoto extremity of the zoom lens system.
Figure 11C:
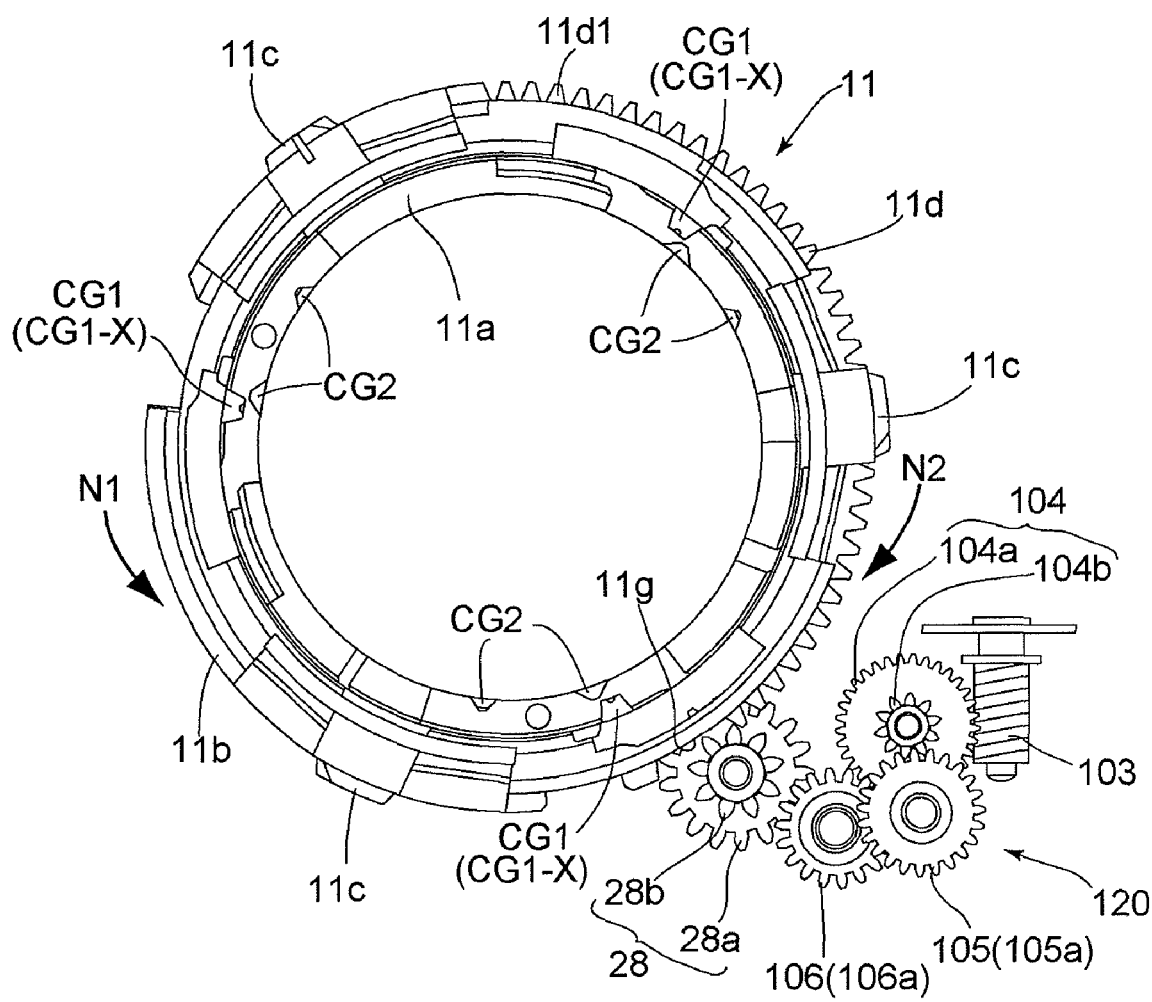
FIG. 11C is a front elevational view of the cam ring and the zoom gear train showing a rotational position at which the peripheral gear of the cam ring starts to mesh (engage) with the cam-ring drive gear.
Figure 11D:
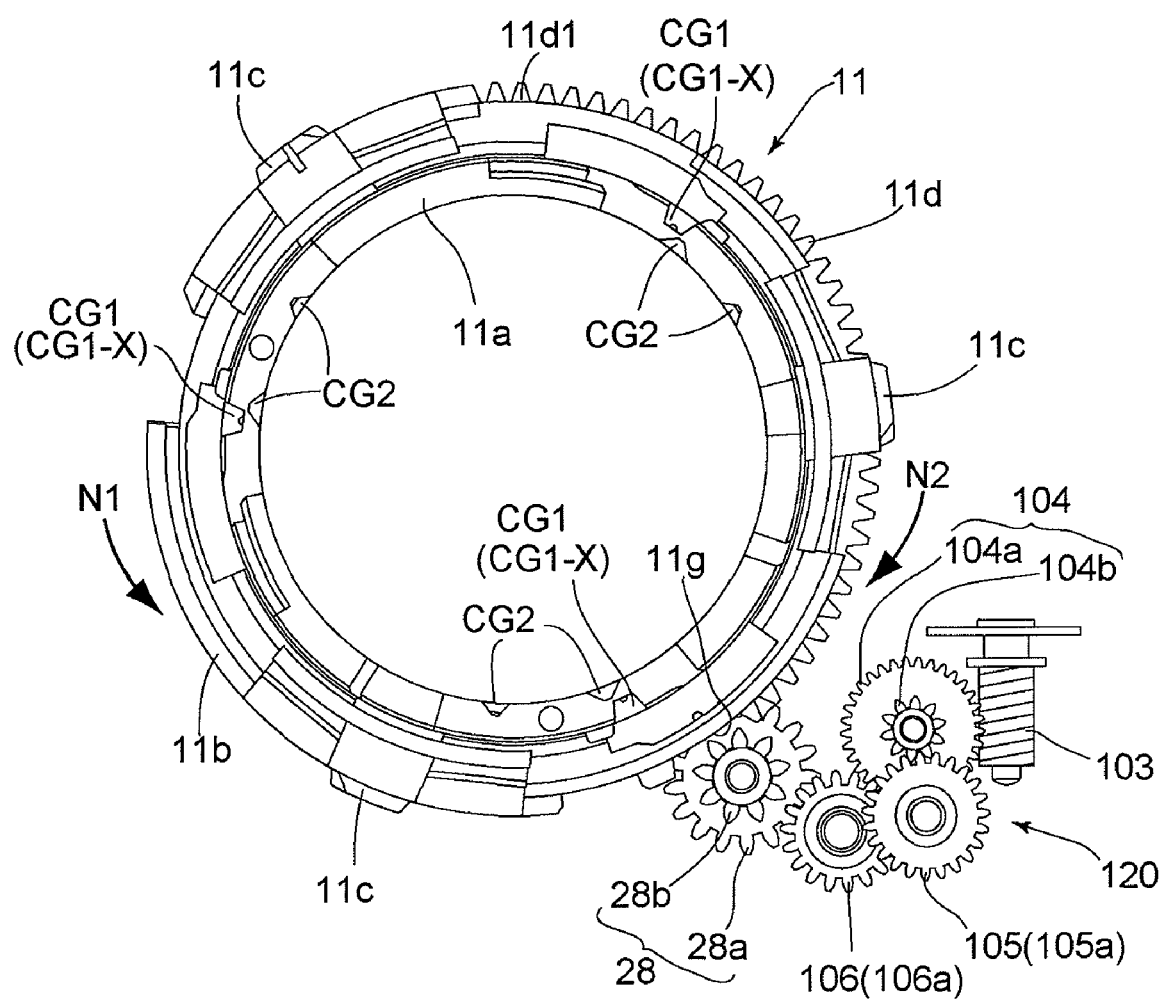
FIG. 11D is a front elevational view of the cam ring and the zoom gear train at the assembly/disassembly position with respect to the housing of the zoom lens barrel.

When assembling the zoom lens barrel ZL, the cam ring 11, in a state where the zoom gear train 120 that includes the cam-ring drive gear 28 is incorporated in between the housing 22 and the image sensor holder 23, is inserted from the front of the cylindrical portion 22a of the housing 22 with the guide projections 11c being respectively inserted into the cam guide-grooves 22d via the insertion/removal openings 22d3. At the assembly/disassembly position of the cam ring 11, as shown in FIGS. 10C and 11D, since the positional relationship between the non-gear section 11g and the long gear portion 28a of the cam-ring drive gear 28 that is positioned within the long-gear accommodating portion 22b of the housing 22 is such that the non-gear section 11g faces the long gear portion 28a, the cam ring 11 can be inserted into the housing 22 without the need for adjusting the degree of meshing between the long gear portion 28a and the peripheral gear 11d.

Thereafter, the cam ring 11 is rotated in the barrel-retracting rotational direction N2 from the assembly/disassembly position to thereby cause the peripheral gear 11d to mesh with the long gear portion 28a of the cam-ring drive gear 28. At this stage, depending on the order in which the members surrounding the cam ring 11 are assembled, it may be difficult to directly access and rotate the cam ring 11. For example, an assembled unit including the linear guide ring 10, the cam ring 11, and the cam-ring connecting ring 14 and the second lens group holding unit 80 can be inserted into the cylindrical portion 22a of the housing 22 from the front side thereof and set so that the cam ring 11 is held at the assembly/disassembly position. Subsequently, the second advancing barrel 12 is inserted into the cylindrical portion 22a of the housing 22 from the front side thereof by inserting the first cam followers CF1 of the second advancing barrel 12 into the assembly/disassembly sections CG1-X of the first-lens-group control cam grooves CG1, respectively. Thereafter, the first advancing barrel 13 is inserted into the front end of the cylindrical portion 22a of the housing 22 by inserting the outer linear-guide keys 12b of the second advancing barrel 12 into the linear guide grooves 13d, respectively. If such an assembly order is carried out, since the cam ring 11 is held at the assembly/disassembly position and is covered by the first advancing barrel 13 and the second advancing barrel 12 so as not to be externally exposed, it is difficult to grasp and manually rotate the cam ring 11 by hand. Alternatively, it is possible to carry out a different assembly order in which the movable lens unit 110 is first assembled by combining the first advancing barrel 13 with the second advancing barrel 12, and thereupon the movable lens unit 110 is assembled onto (inserted into) the housing 22. In such a case also, since the cam ring 11 is not externally exposed, it is difficult to directly rotate the cam ring 11.

As shown in FIG. 9, a rotational component-force imparting surface CG1-K that has a predetermined inclination with respect to the optical axis direction and the circumferential direction is formed at the rear of each assembly/disassembly section CG1-X of the first-lens-group control cam grooves CG1 that are formed on the outer periphery of the cam ring 11. If the second advancing barrel 12 is depressed rearwardly in a state where the first cam followers CF1 are positioned in each respective assembly/disassembly section CG1-X of the first-lens-group control cam grooves CG1, the first cam followers CF1 abut against and press the rotational component-force imparting surfaces CG1-K, respectively, so that a component force is produced that rotates the cam ring 11 in the barrel-retracting rotational direction N2 by the inclined shape of the rotational component-force imparting surfaces CG1-K. Subsequently, the cam ring 11 is rotated in the barrel-retracting rotational direction N2 from the assembly/disassembly position shown in FIG. 11D so that the teeth of the peripheral gear 11d approach and abut against the long gear portion 28a of the cam-ring drive gear 28, as shown in FIG. 11C. Therefore, if the zoom motor 150 is rotatably driven in the lens-barrel retracting direction, the cam-ring drive gear 28 can mesh with the peripheral gear 11d without slipping; thereafter, the cam ring 11 can be rotatably driven as desired from the telephoto extremity shown in FIGS. 10B and 11B to the lens-barrel accommodated position shown in FIGS. 10A and 11A by controlling the rotation of the cam-ring drive gear 28. In other words, the first cam followers CF1 and the rotational component-force imparting surfaces CG1-K constitute a meshing guider (starter), and since this meshing guider enables the peripheral gear 11d to mesh with the cam-ring drive gear 28 by rotating the cam ring 11 via an assembly operation of the second advancing barrel 12, no section of the peripheral gear 11d is formed at the section facing the cam-ring drive gear 28 at the assembly/disassembly position of the cam ring 11 with respect to the housing 22, so that no consideration for the meshing therebetween is required; thereby the overall assembling process for the cam ring 11 is improved.

The present invention has been described with reference to the above illustrated embodiment, however, the present invention is not limited thereto. For example, although the illustrated embodiment of the present invention has been applied to the zoom lens barrel ZL, it is possible to apply the present invention to a lens barrel other than a zoom lens barrel. In such a case, the lens barrel can be a type in which the cam ring 11 remains stationary without rotating or moving in the optical axis direction when the lens barrel is advanced from the accommodated position to a read-to-photograph position. Furthermore, in the case where the present invention is applied to a zoom lens system, it is possible for the cam ring 11 to rotate while moving in the optical axis direction in the zooming range unlike the illustrated embodiment in which the cam ring 11 rotates at a fixed position. In such a case, the long gear portion 28a of the cam-ring drive gear 28 can be suitably extended in length in the forward direction as necessary, and the configuration of the large-diameter gear portion 28b and the large-diameter-gear accommodating recess 11e can be the same as that of the illustrated embodiment.

Furthermore, the illustrated embodiment of the present invention has been applied to a cam ring, however, the present invention can be applied to a rotational ring other than a cam ring. For example, a drive structure for an optical element in a lens barrel is known in the art in which a rotational ring and a linear ring are connected to each other to be relatively rotatable and integrally movable in the optical axis direction, long rotational-transmission grooves that extend in the optical axis direction are formed in the rotational ring and guide grooves (e.g., cam grooves or lead grooves) having a predetermined profile are formed in the linear ring, and cam-followers that are provided on a holding member for the optical element are simultaneously engaged with the guide grooves of the linear ring and with the rotational-transmission grooves of the rotational ring. In such a construction, upon the rotational ring being rotated, the cam-followers, to which rotational force to transmitted, move in the optical axis direction in accordance with the guide grooves in the linear ring, resulting in the optical-element holding member moving in the optical axis direction. In such a construction, it is possible to apply the present invention even to a rotational advancing/retracting structure for rotatably moving the rotational ring in the optical axis direction. Furthermore, it is possible to apply the present invention even to a construction in which a rotational ring corresponding to the cam ring 11 of the illustrated embodiment directly supports the holding member of the optical element without utilizing cam grooves. In such cases, the rotational ring functions as the rotational ring of the present invention (i.e., the cam ring 11) even though such a rotational ring is not provided with cam grooves. In other words, the present invention can be widely applied to various types of lens barrels, providing that the rotational ring of the lens barrel includes a peripheral gear that receives a rotational driving force from a motor and providing that the rotational ring is moved in the optical axis direction by the rotational driving force.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A rotationally extendable structure of a lens barrel comprising:
    a stationary ring;
    a rotational ring, which is supported by said stationary ring to move in an optical axis direction while rotating, said rotational ring including a peripheral gear at the rear end thereof with respect to the optical axis direction; and
    a rotational-ring drive gear, which is rotatably driven by a motor that is supported by said stationary ring,
    wherein said rotational-ring drive gear includes a long gear portion, which has a length, in the optical axis direction, sufficient to mesh with said peripheral gear over an entire moving range of said rotational ring in the optical axis direction, and a large-diameter gear portion provided at the rear end of said long gear portion, wherein a rotational driving force of said motor is transmitted to and drives said large-diameter gear portion, and
    wherein said rotational ring is provided, at the rear end thereof with a large-diameter-gear accommodation recess, said large-diameter gear portion being accommodatable into said large-diameter-gear accommodation portion; wherein when said rotational ring is moved to a rearward movement extremity in the optical axis direction, said large-diameter gear portion of said rotational-ring drive gear enters into said large-diameter-gear accommodating recess so that said large-diameter gear portion is positioned, with respect to the optical axis direction, at a position coincident with a position of said peripheral gear.

2. The rotationally extendable structure according to claim 1, wherein said peripheral gear comprises an offset gear portion which is forwardly offset in the optical axis direction, with respect to the remainder of said peripheral gear, over a section extending in front of said large-diameter-gear accommodating recess.

3. The rotationally extendable structure according to claim 1, wherein said rotational ring is positioned at said rearward movement extremity when said lens barrel is at an accommodated position, and
    wherein said rotational ring moves in a forward optical axis direction from said rearward movement extremity when said lens barrel moves to a ready-to-photograph state.

4. The rotationally extendable structure according to claim 1, wherein said rotational ring comprises a cam ring which is provided with at least one cam groove by which an optical-element holding member, provided with at least one cam follower that is engaged in said cam groove, is guided to move in the optical axis direction relative to said cam ring when said cam ring is rotated.

5. The rotationally extendable structure according to claim 1, wherein a circumferential length of said large-diameter-gear accommodation recess of said rotational ring is determined so as to include a tolerance that is larger than the diameter of said large-diameter gear portion.

\* \* \* \* \*